(12) United States Patent
Kadaba et al.

(10) Patent No.: US 7,535,839 B2
(45) Date of Patent: May 19, 2009

(54) METHOD AND APPARATUS FOR QUALITY-OF-SERVICE BASED ADMISSION CONTROL USING PREDICTION OF SCHEDULING GAIN

(75) Inventors: Srinivas R. Kadaba, Chatham, NJ (US); Thierry Etienne Klein, Fanwood, NJ (US); Kin K. Leung, London (GB); Ganapathy Subramanian Sundaram, Hillsborough, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 718 days.

(21) Appl. No.: 11/172,471

(22) Filed: Jun. 30, 2005

(65) Prior Publication Data
US 2007/0002765 A1 Jan. 4, 2007

(51) Int. Cl.
*G01R 31/08* (2006.01)
(52) U.S. Cl. ........................... 370/230; 370/234
(58) Field of Classification Search .......... 370/230, 370/232, 229, 231, 233, 234; 709/232, 233, 709/231, 230, 229, 227
See application file for complete search history.

(56) References Cited

U.S. PATENT DOCUMENTS

| 6,175,554 | B1 * | 1/2001 | Jang et al. ................ 370/229 |
| 6,453,351 | B1 * | 9/2002 | Endo ......................... 709/229 |
| 6,985,439 | B2 * | 1/2006 | Hosein ....................... 370/230 |
| 2001/0018341 | A1 * | 8/2001 | Dao et al. .................. 455/418 |
| 2002/0097750 | A1 * | 7/2002 | Gunaseelan et al. ......... 370/503 |
| 2003/0214951 | A1 | 11/2003 | Joshi et al. |
| 2004/0081092 | A1 * | 4/2004 | Rhee et al. ................. 370/230 |
| 2004/0082363 | A1 * | 4/2004 | Hosein ....................... 455/560 |
| 2006/0285490 | A1 | 12/2006 | Kadaba et al. |

* cited by examiner

*Primary Examiner*—Pankaj Kumar
*Assistant Examiner*—Steven Medina

(57) ABSTRACT

In a wireless network or other communication system, admission of users to the system is based on predicted scheduling gain. A scheduler is configured to manage access to network resources for users already admitted to the system. An admission control module is coupled to the scheduler, and determines a predicted scheduling gain of the scheduler under an operating scenario involving admission of at least one additional user to the system. The predicted scheduling gain is processed to generate at least one performance metric which is used to make an admission control decision regarding admission of the at least one additional user to the system.

20 Claims, 2 Drawing Sheets

METHOD AND APPARATUS FOR QUALITY-OF-SERVICE BASED ADMISSION CONTROL USING PREDICTION OF SCHEDULING GAIN

RELATED APPLICATION

The present application is related to U.S. patent application Ser. No. 11/156,752, filed Jun. 20, 2005 in the name of inventors S. R. Kadaba et al. and entitled "Method and Apparatus for Quality-of-Service Based Admission Control Using a Virtual Scheduler," which is incorporated by reference herein.

FIELD OF THE INVENTION

The present invention relates generally to wireless networks and other types of communication systems, and more particularly to quality-of-service (QoS) based admission control algorithms for use in such systems.

BACKGROUND OF THE INVENTION

Wireless networks are often configured to support users having different QoS requirements. Such networks typically use a scheduler, implementing a designated scheduling algorithm, in order to meet the QoS requirements.

The term "scheduler" is used herein in a general sense, and accordingly is intended to encompass resource managers which implement various types of resource allocation algorithms. Such resource allocation algorithms may include, in addition to user selection or user ordering algorithms, power control algorithms, rate control algorithms, transmission rate and encoder format selection algorithms, sub-channel allocation algorithms, frequency hopping algorithms, and so on, in any combination.

If the number of users in the network is not too large, the scheduler is usually able to satisfy all the QoS requirements. However, as the number of users in the network increases, it becomes increasingly important to limit the number of users allowed to access the network and to select an appropriate set of users to ensure that the QoS requirements can be satisfactorily met while at the same time maximizing the utilization of the available network resources. Thus, admission control algorithms are used to ensure that the number of users in the network does not exceed the critical limit beyond which the QoS requirements can no longer be satisfied.

The admission control problem is fairly straightforward in wireless circuit-switched networks, but becomes more difficult in wireless packet data networks. The fundamental reason for the added difficulty is that the resources needed to meet the QoS requirements in wireless packet data networks depend not only on the number of users and their QoS requirements, but also on additional factors, such as the locations, channel qualities and traffic patterns of the users. The issue is further complicated by the fact that the mix of applications present in the network is typically varying over time, such that there is no set limit on the maximum number of users that can be admitted to the network.

Current solutions to the admission control problem have generally considered the problem from a circuit-switched point of view, in which a predetermined number of circuits or other channels are available and have to be shared between the competing users. The basic underlying assumption is that each user consumes a finite number of channels, which is fixed and independent of the user location and channel conditions, as well as the locations and channel conditions of the other users. In addition, the QoS requirements in the circuit-switched context typically include the probability of blocking a new call or the probability of dropping a handoff call. Once a user is accepted to the network, it is assumed that the achieved performance is acceptable to the user and the associated application. However, these assumptions are generally not valid in wireless packet data networks that rely on opportunistic scheduling algorithms to allocate the available resources between competing users.

Furthermore, current admission control techniques often consider only such limiting resources as the processing power of the base station, the number of codes available, the channel elements available, the memory and buffer requirements, or the backhaul capacity. However, in a wireless packet data network which supports multimedia applications, the performance as perceived by each application (e.g., in terms of factors such as the minimum achieved throughput, the average throughput, the average and the maximum delay, or the packet loss rate) is of more importance and is in fact expected to limit the number of concurrent applications that can be supported by the network.

It is therefore apparent that current admission control techniques are often based on assumptions which are not readily applicable to wireless packet data networks, and as a result such techniques do not adequately take certain constraints and requirements into account when deciding on the admission or rejection of a new user.

The above-cited U.S. patent application Ser. No. 11/156,752 addresses the drawbacks of conventional practice by providing, in an illustrative embodiment, an improved admission control approach involving the use of a virtual scheduler. The virtual scheduler emulates the operation of an actual scheduler in order to generate a performance metric for a system in which a new user is assumed to be admitted. The performance metric is used to make an admission control decision regarding admission of the at least one additional user to the system.

However, in some applications, the virtual scheduler approach may require more processing time, and associated memory and processor resources, than are available for implementing admission control functionality. Also, the virtual scheduler approach in the illustrative embodiment noted above generally requires explicit knowledge regarding the detailed operation of the underlying scheduling algorithm.

Thus, despite the considerable advances provided by the virtual scheduler approach, a need remains for alternative approaches which can alleviate one or more of the drawbacks of the conventional approaches as outlined above.

SUMMARY OF THE INVENTION

The present invention in an illustrative embodiment provides an improved admission control technique which involves prediction of scheduling gain.

In accordance with one aspect of the invention, as implemented in a wireless network or other communication system, admission of users to the system is accomplished using an admission control module which operates in association with a scheduler. The scheduler is configured to manage access to network resources for users already admitted to the system. The admission control module, which may be coupled to the scheduler, determines a predicted scheduling gain of the scheduler under an operating scenario involving admission of at least one additional user to the system. The predicted scheduling gain is processed to generate at least one performance metric which is used to make an admission control decision regarding admission of the at least one additional user to the system.

In an illustrative embodiment, predicted scheduling gains are determined for respective ones of the admitted and at least one additional users. The predicted scheduling gain may be determined for the at least one additional user at least in part as a function of actual scheduling gains of the admitted users. For example, the predicted scheduling gain may be determined for the at least one additional user as an average of the actual scheduling gains of the admitted users, as a minimum value of the actual scheduling gains of the admitted users, or as another type of function of the actual scheduling gains of the admitted users.

In one possible implementation of this illustrative embodiment, the predicted scheduling gain for the new user may be taken from a table containing values based on off-line simulations. For example, such a table may comprise values of worst case scheduling gains as a function of geometry of the users in a fully loaded system.

An actual scheduling gain may be determined for a given admitted user by measuring an actual performance for that user, computing a virtual performance for the given user indicating the performance that user would have received if it were the only admitted user, and calculating the actual scheduling gain for the given user based on the actual measured performance for that user, the virtual performance of that user and the total number of admitted users.

In addition, predicted virtual performance may be computed for respective ones of the admitted and at least one additional users. The predicted scheduling gains and corresponding predicted virtual performances may be utilized to calculate performance metrics for respective ones of the admitted and at least one additional users. The performance metrics determined for respective ones of the admitted and at least one additional users may be processed using corresponding acceptability criteria in order to make the admission control decision regarding admission of the at least one additional user to the system.

Advantageously, the admission control techniques of the illustrative embodiments do not require explicit knowledge of the underlying scheduling algorithm(s). However, such explicit knowledge, when available, may be utilized in a given embodiment to facilitate the prediction of scheduling gain.

The present invention in the illustrative embodiments provides a number of additional advantages over conventional practice. For example, the admission control techniques of these embodiments incorporate the QoS requirements of the different users into the admission control decision. Also, the admission control decision is tailored towards wireless packet data networks and the use of opportunistic scheduling algorithms.

DETAILED DESCRIPTION OF THE INVENTION

Figure 1A:
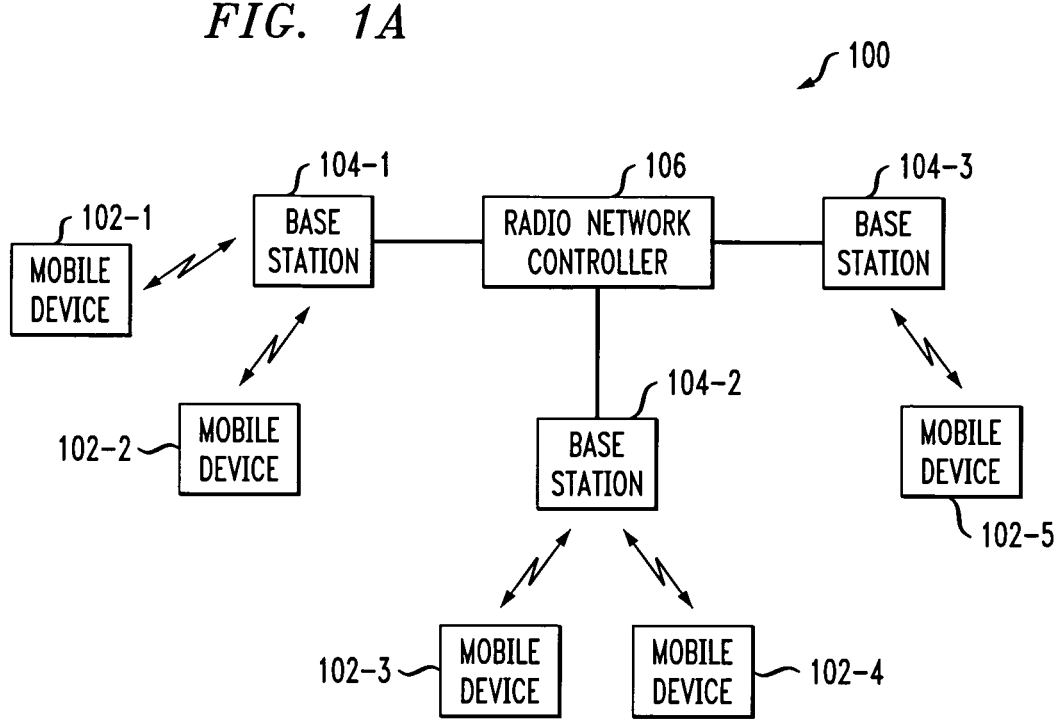
FIG. 1A is a block diagram of a communication system in which the present invention may be implemented.

The invention will be described herein in conjunction with exemplary communication systems and associated admission control techniques. It should be understood, however, that the invention is more generally applicable to any admission control application, in any type of wireless network or other communication system, in which it is desirable to provide an enhanced ability to determine an appropriate level of admissible users in the presence of one or more QoS requirements. For example, although the admission control techniques in the illustrative embodiments are particularly well suited for use in CDMA 2000 and UMTS networks, the invention is not restricted to use with any particular type of wireless network or other communication system. The techniques can be applied to forward links, reverse links, or both, as well as other types of links or more generally other shared communication media.

The term "call" as used herein is intended to be construed generally, so as to encompass, by way of example, not only voice calls, but also other types of applications, connections, sessions or other communications, involving data, audio, video, speech or other information, in any combination.

The term "user" as used herein is also intended to be construed generally, so as to encompass, by way of example, a communication device such as a mobile telephone, computer or personal digital assistant (PDA), or portions or combinations of such devices. The term may also be used to refer to an associated application, individual or other entity which makes a call within a system using a communication device.

The term "module" as used herein should not be construed as requiring any particular physical configuration. A module may comprise hardware, software or firmware, or combinations thereof.

As indicated above, the term "scheduler" as used herein is intended to be construed generally, so as to encompass, by way of example, any arrangement of hardware, software or firmware, or combination thereof, which performs at least a portion of a scheduling algorithm. Accordingly, a scheduler in one embodiment may comprise, for example, a resource allocation module or other type of resource manager that operates in conjunction with a scheduling algorithm, or in another embodiment may itself be an element of a resource manager which incorporates, in addition to the scheduler, a resource allocation module. Thus, a scheduler may be, for example, a resource manager which implements one or more resource allocation algorithms. As noted previously herein, such resource allocation algorithms may include, in addition to user selection or user ordering algorithms, power control algorithms, rate control algorithms, transmission rate and encoder format selection algorithms, sub-channel allocation algorithms, frequency hopping algorithms, and so on, in any combination. It is to be appreciated that these and other algorithms, as well as combinations thereof, are intended to fall within the scope of the general term "scheduling algorithm" as used herein.

FIG. 1A shows a simplified diagram of a portion of a communication system 100 in which the present invention may be implemented. The system, which may be a CDMA 2000 or UMTS network, comprises a plurality of mobile devices 102-1, 102-2, . . . 102-5, which communicate with base stations 104-1, 104-2 and 104-3 as shown. The base stations are coupled to a radio network controller (RNC) 106. The mobile devices 102 may be viewed as examples of what are more generally referred to herein as communication devices, or still more generally, users. Of course, the system may include a substantially larger number of mobile devices, base stations and RNCs, as well as additional elements not explicitly shown, as will be appreciated by those skilled in the art.

Figure 1B:
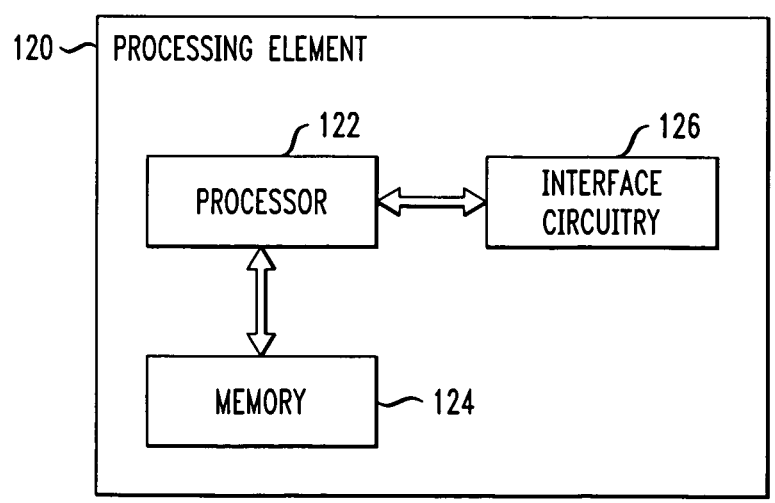
FIG. 1B shows a processing element of the FIG. 1A system.

A given processing element of the system 100, such as a particular mobile device, base station, RNC, or a portion thereof, may be configured generally as shown in FIG. 1B. As illustrated in the figure, a processing element 120 comprises a processor 122 that is coupled to a memory 124 and to interface circuitry 126. The processor 122 may comprise one or more microprocessors, digital signal processors, central processing units, application specific integrated circuits, or other types of processors, as well as portions or combinations of such devices. Memory 124 may comprise random access memory (RAM), read-only memory (ROM), magnetic or optical media, or other types of storage devices, as well as portions or combinations of such devices. The characteristics of the interface circuitry 126 will vary depending upon the functionality of the processing element. For example, if the processing element 120 is viewed as one of the base stations 104, the interface circuitry may comprise RF circuitry for supporting forward link and reverse link communication with the mobile devices 102, and additional circuitry for interfacing with the RNC 106.

Conventional aspects of the operation of system 100 and processing element 120 are well known to those skilled in the art, and therefore not described in detail herein.

The present invention in an illustrative embodiment provides an admission control technique which determines whether a wireless network, such as that of FIG. 1A, can support a new user, with its associated QoS requirements, without violating any of the QoS requirements of the existing users already admitted to the network. The admission control technique in the illustrative embodiment is based on prediction of the performance of a system which includes the existing and new users.

In the illustrative embodiment, N refers to the number of admitted users in the system, also referred to as "existing users," with the term "user" being construed generally so as to encompass, for example, different services, applications, connections, sessions, traffic types, etc. of a given physical user. Thus, the number of admitted users may be greater than the number of admitted communication devices, as a given communication device may have multiple services, applications, connections, sessions, etc. associated therewith, each being considered a separate user in the illustrative embodiment.

In one possible approach, all of the admitted users may be considered when the admission control decision is made. More generally however, one may prefer to consider only a subset of the admitted users and apply the admission control mechanism to that subset of users. Such a pruning of the set of users may make sense for example if some users are located in very unfavorable channel conditions. In that case, we may not want to consider those users when making the admission control decision as their infeasibility is not reflective of system overloading. In other scenarios, the system may have several classes of users, say gold, silver and bronze users. If the scheduling algorithm is such that it would always give absolute priority to the gold users, then the silver users are transparent to the gold users. If a new user is also a gold user, then the admission control criterion should only be applied to the gold users in that case and not include the silver users.

Different algorithms can be considered for pruning the set of users. For example, one could only consider all the users whose geometry (or average channel condition) is larger than a specified threshold. Alternatively, one may consider all the users whose virtual throughput is larger than a specified threshold, or whose virtual delay is smaller than a specified threshold, or whose virtual delay is smaller than a fixed percentage of the maximum allowed delay. Numerous alternative pruning techniques may be used.

Assuming by way of example that there are N admitted users, the admission control (AC) decision in an illustrative embodiment is whether or not to admit user N+1. Of course, the described techniques can be adapted in a straightforward manner to accommodate a wide variety of other types of admission scenarios. As indicated previously, it should be understood that the new user may be a new service, application, connection, session, traffic type, etc. for one of the existing users.

Figure 2A:
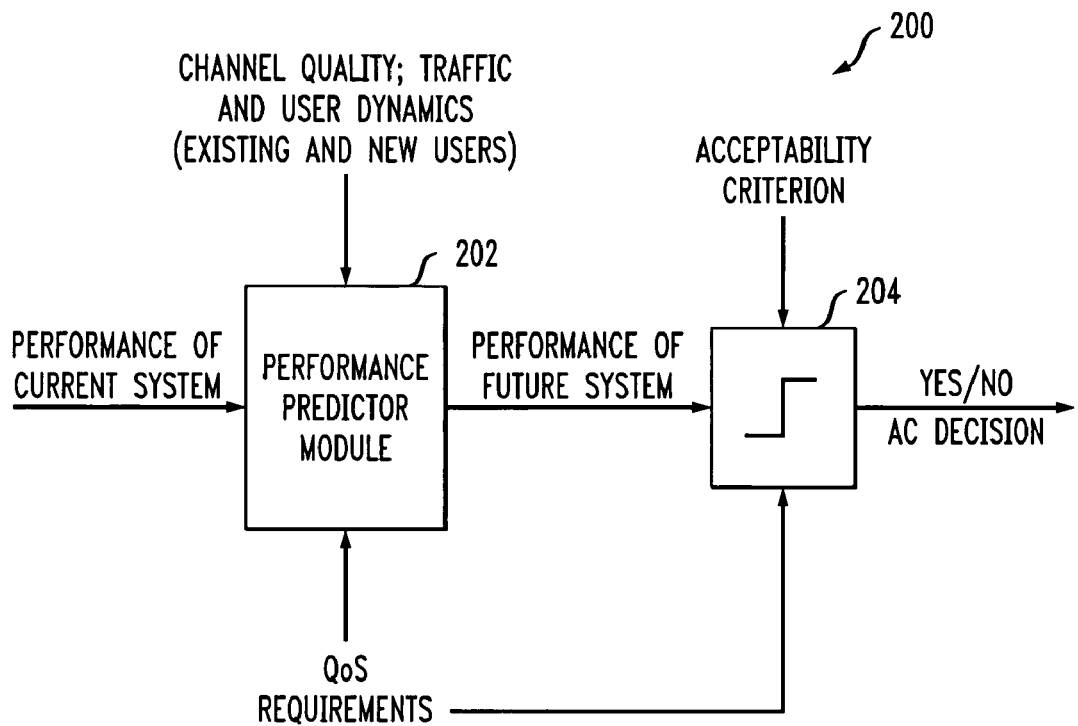
FIG. 2A is a block diagram of an admission control module that may be incorporated into a base station or other processing element of the FIG. 1A system, in accordance with an illustrative embodiment of the present invention.

FIG. 2A shows an admission control module 200 which implements an admission control technique in the illustrative embodiment. The admission control module 200, also referred to herein as an AC module, comprises a performance predictor module 202 coupled to a decision module 204.

The performance predictor 202 uses the performance of the current system and the QoS requirements of the existing and new users, along with information on the channel qualities and the traffic and user dynamics of the existing and new users, to arrive at a prediction of the performance of the future system assuming that the new user would be admitted. The future system, also referred to herein as an "augmented system" of N+1 users, is thus assumed to be the same as the current system of N users but with the new user admitted.

The decision module 204 compares the predicted system performance to an acceptability criterion, which takes into account the QoS requirements to determine whether the predicted performance is deemed satisfactory. If the predicted performance meets the expectations as set forth by the acceptability criterion, the new user is admitted to the system. Otherwise, the admission request is rejected. The decision module 204 thus generates as its output an AC decision, which in this embodiment is a Yes/No decision regarding the admission of user N+1 to a network with N admitted users.

As indicated above, the illustrative embodiment assumes that the network satisfies a feasibility condition, i.e., the QoS requirements for all N admitted users are satisfied, prior to arrival of the new user. The AC module 200 then has to decide whether or not the new user can be admitted without violating the feasibility condition. In other words, the new user is admitted only if the QoS requirements of the new user can be satisfied while also continuing to satisfy the QoS requirements of the existing users. Further considerations can be taken into account before making the final decision, as will be apparent to those skilled in the art.

It is to be appreciated that the particular AC module configuration shown in FIG. 2A is not a requirement of the present invention. Other configurations of elements, with other input and output signal arrangements, may be used to make AC decisions using the techniques of the present invention.

Figure 2B:
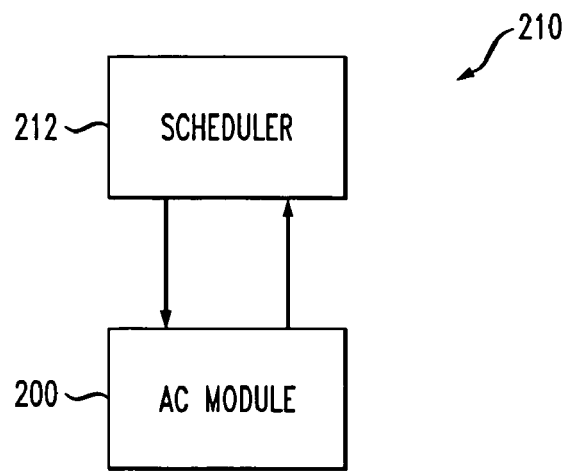
FIG. 2B is a block diagram illustrating interaction between the admission control module of FIG. 2A and a scheduler of the system.

In accordance with an aspect of the invention, the AC module 200 of FIG. 2A interacts with a resource allocation module of the system. Such a resource allocation module is more generally referred to herein as a scheduler. FIG. 2B shows an example of a processing element 210 of the system, which comprises AC module 200 coupled to scheduler 212.

The processing element 210 may comprise a processor coupled to a memory, as illustrated generally in FIG. 1B, and the AC module 200 and scheduler 212 may be implemented at least in part in the form of software that is stored in the memory 124 and executed by the processor 122. Of course, numerous other arrangements of hardware, software and firmware, in any combination, may be used in implementing the present invention.

One or more AC modules 200 may be associated with each of the base stations 104 of the FIG. 1A system. For example, the AC decisions could be made at each base station for the users that initiate calls with that base station. However, if the processing capabilities at the base stations are limited, it may be preferable to make the AC decisions at other locations in the network. As an example of one such alternative arrangement, the AC decisions could be made at the RNC 106, which would then incorporate one or more of the AC modules 200. An added advantage of this latter arrangement is that the RNC may have access to application-layer information that can aid in the AC decision process. Furthermore, the RNC has a more global view of the network that spans across multiple base stations, thereby ensuring that the AC decision is consistent with the general status and loading conditions of the network. In the illustrative embodiment, since call processing is typically performed at the RNC, the RNC at least has to be informed of the AC decision, independently of where the actual decision is made. Regardless of the location of the AC module, it is assumed that all the parameters needed to arrive at the AC decision are available or can be conveyed to the AC module.

Although shown in the FIG. 2B embodiment as being implemented in a single processing element, it is possible for the AC module 200 and scheduler 212 to be implemented using multiple processing elements, e.g., a first processing element to implement the AC module and a second processing element to implement the scheduler 212. These multiple processing elements may be in a single system base station, a single RNC, or distributed across a number of such base station or RNC elements.

In the illustrative embodiment, it is assumed that the QoS requirements cannot be renegotiated if the initial set of requirements was deemed infeasible. However, the techniques described can be extended in a straightforward manner to accommodate arrangements involving renegotiation of QoS requirements.

Also, if the QoS requirements of the existing user and the new user cannot be satisfied simultaneously, it is considered preferable, from a customer satisfaction point of view, to block the new user, rather than to admit this user and drop an existing user from the system. Other rules can be used in alternative embodiments.

It is further assumed in the illustrative embodiment that the arrival rate of new users is relatively small compared to the timescale of the scheduler. In other words, it is assumed that once a new user has been admitted to the network, the network reaches its new steady state before the next user arrival. This assumption allows us to focus on single-user admission scenarios.

These and other assumptions made herein are for simplicity and clarity of description only, and should not be construed as limiting the scope of the invention in any way. Those skilled in the art will recognize that the invention can be implemented in alternative embodiments in which one or more of these assumptions do not apply.

The AC module 200 is typically operating in real-time during the operation of the network and assumes that a certain number of users have been admitted to the network and are being satisfactorily served.

The illustrative embodiment makes AC decisions at least in part based on prediction of scheduling gain, as will now be described in greater detail.

At the time of the AC decision, we consider a system of N users. As noted above, this system is deemed to be feasible, i.e., all the QoS requirements of the N users are satisfied. The scheduler 212 allocates available resources between the competing users, and is assumed to be an opportunistic and fair resource allocation manager. In particular, in any given time slot, a subset of the users is scheduled for transmission. The scheduler is opportunistic in the sense that it attempts to schedule users when their channel and traffic conditions are relatively favorable, compared to their statistical behavior and compared to those conditions of the other users in the system. The performance gain, with respect to a given metric, that is attributable to the opportunism of the scheduler may be viewed as an illustrative example of what is broadly referred to herein as a "scheduling gain." The underlying performance metrics typically depend on the type of traffic being served.

Scheduling gain based admission control in the illustrative embodiment generally proceeds as follows.

1. The performance of the existing system of users is measured. Typically, the performance is quantified using quantities such as the received throughput, the experienced delay or the packet loss rate.

2. Different quantities related to the wireless channel environment are measured for each user. From these measurements, a virtual performance is calculated for each user. The virtual performance is the performance that each user would have received if it were the only user in the system.

3. The scheduling gain is then calculated based on the measured performance of the actual system, the virtual performance and the number of users in the network.

4. The future virtual performance for each user is predicted based on the measured and calculated quantities of the existing users and knowledge of the new user's channel conditions.

5. The scheduling gain of each user in the augmented system is predicted assuming that the new user is in fact admitted to the system.

6. The performance of each user in the augmented system is calculated from the predicted virtual performance and the predicted scheduling gain.

7. The predicted performance of each user is compared to the acceptability criterion and the QoS requirements in order to make the AC decision.

In the following description, the above-described process will be described in greater detail for a number of different types of traffic and QoS requirements. It should be understood, however, that the processing steps given above are presented by way of illustrative example, and other processes can be used in implementing the invention. These other processes may, for example, alter the ordering of certain of the steps, modify one or more steps, eliminate one or more steps, combine multiple steps into one step, include additional steps that are not shown, and so on.

It should be noted that, in a given embodiment, at least a subset of the computations may be performed in an "off-line" manner. For example, the predicted scheduling gain for the new user may be taken from a table containing values based on off-line simulations. As a more particular example, such a table may comprise values of worst case scheduling gains as a function of geometry of the users in a fully loaded system. A wide variety of alternative implementations of such table-based embodiments are possible, as will be readily appreciated by those skilled in the art.

Infinitely Backlogged Users

As a first scenario, we consider data users that always have traffic to transmit. In other words, user queues at the base station are always backlogged and whenever the base station scheduler decides to schedule a particular user, there is enough data in the transmit buffer to effectively transmit to the user at the largest possible transmission rate allowed by the channel condition. For infinitely backlogged users, the performance metric of interest is the achieved long-term data throughput. The QoS requirement is typically expressed as a requirement that the achieved long-term throughput is larger than a minimum desired throughput.

The scheduling gain of each user is then defined with respect to the throughput experienced by the user as follows:

$$G_i(N) = \frac{NT_i(N)}{R_i},$$

in which N is the number of users in the system. $T_i(N)$ denotes the achieved throughput of user i under the given opportunistic scheduling algorithm when N competing users are present in the system. $R_i$ denotes the virtual throughput that user i would experience if it were the only user in the system.

In general, it is very difficult to obtain a closed-form analytical expression for the scheduling gain except in some very restrictive cases that are of little practical use. For the sake of completeness, we point out that for the case of homogeneous users, under Rayleigh fading and a linear relation between the channel condition and the transmission rate, the scheduling gain $G_i(N)$ under the Proportional Fair scheduling algorithm is given by the harmonic series. In particular the scheduling gain is the same for all the users:

$$G_i(N) = 1 + \frac{1}{2} + \frac{1}{3} + \frac{1}{4} + \ldots + \frac{1}{N}.$$

However, the scheduling gain generally cannot be assumed to be the same for all users. In addition, no simple expression exists for more general scenarios or for different schedulers. Therefore, in a general scenario, the scheduling gain may be calculated using the first equation for $G_i(N)$ given above, where the number of users N is known, the throughput $T_i(N)$ is measured and the virtual throughput $R_i$ is calculated from the measured channel qualities (e.g., the carrier to interference power ratio (C/I) or the signal to interference and noise power ratio (SINR)) and the corresponding feasible transmission rates. The throughput and the virtual throughput can be calculated as long-term averages or over a finite time window.

In the admission control problem, the central question is to determine whether the admission of a new user would lead to an infeasibility of the system, i.e., to a situation in which one or more of the QoS requirements would be violated. Therefore a crucial step is the estimation and prediction of the achieved throughput performance of the augmented system of N+1 users. Note that if an analytical and closed-form expression were available to describe the achieved performance for a given opportunistic scheduler, this expression could be used to calculate the achievable throughput in the augmented system through the following expression:

$$\hat{T}_i(N+1) = \frac{\hat{G}_i(N+1)}{N+1} R_i, \quad \forall i = 1, \ldots, N+1,$$

where the "hat" notation indicates that the corresponding quantity is an estimate for the augmented system. Implicitly we assume that the future virtual throughput of each existing user in the augmented system is the same as the virtual throughput of the same user in the existing system. If the new user requesting admission to the system corresponds to a physical user already present in the system, the virtual throughput of that user is taken as the virtual throughput for the candidate user. If on the other hand, the new user requesting access corresponds to a new physical user, then the corresponding virtual throughput is calculated based on the long-term channel condition of the new user.

Since closed-form analytical expressions of the scheduling gains are not available for the cases of practical interest, we estimate the scheduling gains in the augmented system. In the following paragraphs, we describe the general methodology and then specialize the methodology to some simple examples. We choose a particular example to illustrate the methodology and obtain some insights into the underlying admission control.

In general, the scheduling gain of user i in the augmented system of N+1 users can be estimated based on the scheduling gains of the users in the system of N users, as well as those of systems with fewer users. For generality, the particular minimum throughput requirements might also be included and could parameterize the estimation functions. Let $f_i$ denote an estimation function for user i, such that:

$$\hat{G}_i(N+1) = f_i(\{G_j(N)\}_{j=1}^N, \{G_j(N-1)\}_{j=1}^{N-1}, \{G_j(N-2)\}_{j=1}^{N-2}, \ldots, \{G_j(N-k)\}_{j=1}^{N-k}),$$

where k indicates the number of network loads used in the interpolation of the scheduling gains. The above estimation procedure is used both for the estimation of the scheduling gains of the existing users in the augmented system, as well as for the estimation of the scheduling gain of the new user in the augmented system.

We now consider two simple examples to illustrate the above methodology and estimation procedure through two specific choices of the functions $f_i$.

EXAMPLE 1

As a specific first example, we consider that the scheduling gain of the existing users is estimated as follows:

$$\hat{G}_i(N+1) = G_i(N), \quad \forall i = 1, \ldots, N.$$

In other words, the scheduling gain of the existing users is estimated to remain constant when the new user is admitted to the system. This is a conservative estimate of the scheduling gain as it does not take into account the additional gains of multi-user diversity that may be realized due to the presence of the additional user. The rationale behind this approximation is that the scheduling gain (at least in the case of homogenous users) is a monotonically increasing and concave function. Therefore, as the number of users in the system increases, the additional increase in the scheduling gain decreases and can be considered to be fairly constant especially when the number of existing users in the system is sufficiently large. This approximation is only valid if the users are homogenous (e.g., all the users have the same minimum throughput requirements) and if the scheduler implements strict priority classes.

In the current example, the scheduling gain of the new user is estimated as the average of the scheduling gains of the existing users in the network:

$$\hat{G}_{N+1}(N+1) = \frac{1}{N} \sum_{i=1}^N G_i(N).$$

Using only known quantities in the system, the scheduling gains can be further calculated according to the following expressions:

$$\hat{G}_i(N+1) \cong \frac{NT_i(N)}{R_i}, \quad \forall i = 1, \ldots, N$$

$$\hat{G}_{N+1}(N+1) = \sum_{i=1}^{N} \frac{T_i(N)}{R_i}$$

Using the expression relating the estimated scheduling gain to the throughput, we may now calculate the predicted throughput for all the users in the augmented system as:

$$\hat{T}_i(N+1) \cong \frac{N}{N+1} T_i(N), \quad \forall i = 1, \ldots, N$$

$$\hat{T}_{N+1}(N+1) = \frac{1}{N+1} \sum_{i=1}^{N} \frac{T_i(N)}{R_i} R_{N+1}$$

EXAMPLE 2

We now present a second example for the estimation of the scheduling gains in the augmented system that can be viewed as another instantiation of the general framework previously described. This second approach is a somewhat more conservative approach and estimates the scheduling gain of the new user as the minimum of the scheduling gains of all the existing users in the system. The scheduling gains of the existing users in the augmented system are estimated in the same fashion as in Example 1 and therefore we have the following solution in this case:

$$\hat{G}_i(N+1) = G_i(N), \forall i=1, \ldots, N.$$

Since the scheduling gain of the new user is estimated as the minimum value of the scheduling gains of all the existing users in the system, we have that:

$$\hat{G}_{N+1}(N+1) = \min_{i=1,\ldots,N} [G_i(N)].$$

Using the expression relating the scheduling gain to the throughput, we obtain the following expressions for the estimated throughput of the existing users in the augmented system:

$$\hat{T}_i(N+1) \cong \frac{N}{N+1} T_i(N), \quad \forall i = 1, \ldots, N,$$

which is identical to the estimate of the throughput of the existing users in Example 1. Similarly, the throughput of the new user in the augmented system is now estimated according to the following expression:

$$\hat{G}_{N+1}(N+1) = \min_{i=1,\ldots,N} \left[ \frac{NT_i(N)}{R_i} \right],$$

$$\hat{T}_{N+1}(N+1) = \frac{1}{N+1} \min_{i=1,\ldots,N} \left[ \frac{NT_i(N)}{R_i} \right] R_{N+1}$$

We emphasize that the foregoing are two simple examples to illustrate the general framework for the estimation of the scheduling gains in the augmented system when all the users are infinitely backlogged and traffic dynamics are not taken into account.

Another example includes using knowledge of the scheduling algorithm. For instance, if we knew in advance that the scheduling algorithm was Proportional Fair and that traffic was homogenous, we could use the harmonic series equation presented previously herein, with N being replaced by N+1, to estimate the scheduling gain.

Of course, other estimation functions, such as a weighted linear combination of the scheduling gains or an interpolation of the scheduling gains for different network loading conditions, are equally applicable and fall within the general framework of the admission control methodology. The particular examples were chosen as they appear to provide a good compromise between the complexity of the prediction and the achieved admission control performance.

We now turn our attention to the admission control mechanism per se and compare the predicted throughputs in the augmented system to QoS requirements to arrive at the admission control decision. As noted previously, the objective of the QoS-based admission control is to ensure that, if the new user were admitted to the system, the QoS requirements of all the users (including the existing users and the new candidate user) in the augmented system can be satisfied. In the case of infinitely backlogged users, the QoS requirements are typically expressed through a minimum throughput requirement $T_{min,i}$, which may in general be different for different users. This added generality allows us to consider different traffic and service classes. It may also reflect different requirements depending on the underlying application run by the user. Furthermore, we illustrate our proposal assuming that the scheduling gain of the new user is predicted as the average scheduling gain of all existing users in the system as described in Example 1 above. The equivalent calculations can be performed with the estimated scheduling gain as described in Example 2.

In this situation, the new user should be admitted to the network if the following conditions are satisfied:

$$\hat{T}_i(N+1) \geq T_{min,i}, \forall i=1, \ldots, N+1.$$

This condition can be written in an equivalent form using only the measured throughputs in the existing system and the average transmission rates of all the users.

$$T_i(N) \geq \left(1 + \frac{1}{N}\right) T_{min,i}, \quad \forall i = 1, \ldots, N$$

$$\sum_{i=1}^{N} \frac{T_i(N)}{R_i} \geq (N+1) \frac{T_{min,N+1}}{R_{N+1}}$$

The two conditions that need to be verified before the new user is admitted to the network have a very appealing intuitive interpretation. The first equation means that the currently achieved throughput of every existing user has to be larger than the minimum required throughput by an amount equal to a fair share of the minimum throughput requirement. This condition can be interpreted as an "individual headroom" for each existing user by assuming that the fair allocation of resources in the augmented system leads to a decrease in throughput that is proportional to the number of users in the system. For the existing users to remain feasible in the augmented system, the currently achieved throughput needs to be larger than the minimum required throughput by an amount at least equal to the projected decrease in throughput. The second condition can similarly be interpreted as a "collective headroom" for the existing system of N users. The allocation of resources to the new users degrades the performance of the entire system. By how much the performance is degraded clearly depends on the average transmission rate of the new user (or in other words, on the geometry of this user) and the minimum throughput requirement of the new user. For the new user to be feasible, the existing system should collectively be able to afford at least enough resources as are required to satisfy the throughput requirement of the new user.

Data Users with Bursty Traffic

We now extend the general framework of the scheduling gain approach to a scenario in which the users have bursty traffic and the dynamics of the data arrival processes are taken into account. We continue to denote a particular user by index i. Note that again user i refers to a logical user and may represent, for example, a particular application, connection or session of a physical user. In case that a mobile terminal has several simultaneous applications, connections or sessions, we consider them as multiple logical users. Let j denote a measurement index, i.e., the index of a perception window over which the user's performance is monitored. In the case of bursty traffic, one performance measure would be the average achieved throughput over the perception window. The perception window could, for example, be measured over a particular web page, or series of web pages. For file transfers, it could be measured over an entire file, part of the file, multiple files, etc. Alternatively, it could be a fixed period of time determined independently of the traffic dynamics or even the entire call duration.

We now introduce specific notation to describe the above concepts more precisely. Let $T_{ij}(N)$ denote the achieved throughput of user i over the perception window j when N logical users are present in the system. For every logical user, we now define the virtual throughput $R_{ij}$ associated with the actually measured throughput in the multi-user system. The virtual throughput is calculated over some perception window, which is typically the same as the perception window used for the calculation of $T_{ij}(N)$. The virtual throughput represents the throughput that user i would have experienced over the j-th perception window if user i were the only user in the system. Of course, this quantity cannot be measured and has to be estimated, based on the user's channel quality.

The throughput and the virtual throughput are related through the following expression:

$$T_{ij}(N) = \frac{G_{ij}(N)}{N} R_{ij}$$

where $G_{ij}(N)$ denotes the scheduling gain experienced by user i over the j-th perception window. The index i ranges from 1 to N and denotes all the logical users in the system. The index j ranges from 1 to M and denotes all the perception windows for which the throughput has been measured. The above expression may serve as a definition of the scheduling gain for bursty traffic:

$$G_{ij}(N) = \frac{NT_{ij}(N)}{R_{ij}}$$

The throughput $T_{ij}(N)$ is directly measured in the multi-user system. The number of active users is known by monitoring the traffic activity at the base station. However, the calculation of the virtual throughput $R_{ij}$ is not straightforward, as the effects of retransmission and hybrid automatic repeat request (HARQ) need to be taken into account. It should be noted that these effects are not restricted to the case of data users with bursty traffic, and accordingly may also be taken into account, for example, in the case of infinitely backlogged users.

One option is to disregard the impact of HARQ and simply calculate the virtual throughput based on the instantaneous measured channel qualities. This option is not entirely satisfactory since the impact of HARQ and the associated early termination gain is not the same for all the users in the system and may depend, among other factors, on the users' long-term channel conditions, their velocity and the corresponding Doppler effect.

Another option is to use the instantaneously measured C/I value to calculate a corresponding data transmission rate. From the calculated value, a predicted feasible data transmission rate can be obtained (through, for example, a minimum mean square error prediction algorithm based on a Kalman filter) that corresponds to the transmission rate that could be supported in a single-user system with a fixed post-HARQ frame error rate. The virtual throughput is then calculated from the predicted data rate. We note that the outlined approach is just one possible prediction methodology and other options can be considered.

A third possibility for calculating the virtual throughput while taking into account the physical layer retransmissions is to keep a record of the time series of the experienced channel qualities and C/I values. At the end of the perception window, using the record of the C/I values, one can calculate the data transmission rates that were indeed achievable. This is a non-causal calculation but it is still appropriate for the purpose of calculating the virtual throughput. This latter approach is the preferred method as it provides the most accurate calculation of the virtual throughput, since it relies on accurate (even if delayed) information of the instantaneous channel conditions. This approach can be implemented, for example, in low-complexity and/or low-memory consumption methods so that the entire record of all the C/I values does not have to be stored.

The QoS feasibility criterion for a user with bursty traffic is then related to the relative performance of the achieved throughputs over different perception windows with respect to some target performance. A typical QoS performance criterion would for example be that a fixed percentage, denoted by x, of the perception windows should have a throughput larger than a minimum acceptable value $T_{min,i}$. As a concrete example, the QoS performance may dictate that 95% of the measured throughputs (over the respective perception windows) are larger than 38.4 kbps. Alternative QoS feasibility criteria may of course be considered. In fact, a somewhat similar criterion would stipulate that all the perception windows need to have a throughput larger than a certain percentage of the minimum acceptable throughput value. More concretely, the QoS criterion would dictate that all the measured throughputs (over the respective perception windows) are larger than 95% of the minimum required value of 38.4 kbps.

The next steps in the admission control process are the prediction of the performance of the augmented system and the prediction of the virtual throughputs and the scheduling gains of the existing users and of the new user assuming that the new user is in fact admitted to the system.

More specifically, we need to predict $\hat{R}_{ij}$ for all users $i=1, \ldots, N+1$ (including the existing and the new user) and for future perception windows $j=M+1, \ldots, M+K_i$, where $K_i$ is an index of how many perception windows user i is expected to experience in the future. Note that $K_i$ in general depends on the user departure and traffic processes, on how long the user expects to remain connected to the system, and on how many pages or objects the user expects to receive and/or transmit during that connection time. In general, $K_i$ may also be a function of how long the user has already been connected to the network and the performance received so far, as well as the predicted perceived performance in the future, as the latter may influence the departure process from the network. Similarly, the future scheduling gains $\hat{G}_{ij}(N+1)$ of all the users and for future perception windows need to predicted or estimated.

First, let us consider different methods for predicting $\hat{R}_{ij}$. For an existing user (and for the new logical user, if it corresponds to an existing physical user), a simple first method is to predict the virtual throughput $\hat{R}_{ij}$ as the mean value of the measured virtual throughputs $R_{ij}$ over the past perception windows. Note that all the past perception windows can be considered in the average calculation or only a certain number of the most recent measured values may be considered. Alternatively, the predicted virtual throughput $\hat{R}_{ij}$ can be taken as a fixed percentile, denoted by $y_i$, of the distribution of all the measured virtual throughputs $R_{ij}$. Again we emphasize that all the measured virtual throughputs for the logical user i or only a limited set of measured values from the most recent past may be considered for this calculation. A special case, which would correspond to a fairly conservative choice of the prediction of the virtual throughput, is to select the minimum measured value as the predicted value. The factor $y_i$ is in general a function of the grade of service of the user.

For example, a system may support different classes of importance for the users, called the gold, silver and bronze classes. In that case, all the users in a given class would have the same parameter $y_i$ but the parameter would be different for different classes. In particular, the parameters would be chosen such that:

$y_{gold} \leq y_{silver} \leq y_{bronze}$

Using gold, silver and bronze classes is just one example. In a given system, there may be more than three grades of service, and the parameter y can be relaxed (or increased) as we go down the classes from high to low.

The two methodologies for predicting the virtual throughputs for future perceptions windows yield a single value. Other mechanisms that predict a sequence of virtual throughputs $\hat{R}_{ij}$ for $j \geq M+1$ can also be used in this framework. Such mechanisms may make use of the traffic and page arrival processes as well the user arrival and departure processes.

Finally, we predict the virtual throughput for a new logical user that also corresponds to a new physical user. In that case, there is no history of measured or calculated virtual throughputs that could be used as a basis for the prediction of the future virtual throughput. However, we assume that the long-term channel quality and the user geometry are available to the prediction module. Since these parameters have a decisive role in determining the virtual throughput value for a user, we choose the existing user closest in geometry to the new user.

The corresponding series of virtual throughputs for this closest user is then taken as the basis for the virtual throughput prediction. The virtual throughput for the new user is predicted in similar fashion to the existing user, albeit with the $y_i$ corresponding to the grade of service of the new user. In particular, if the new user and the user closest in geometry belong to the same class and have the same grade of service, the predicted throughput for the new user is identical to that of the user closest in geometry. On the other hand, the predicted throughputs could differ if the users belong to different grade of service classes.

The scheduling gains $\hat{G}_{ij}(N+1)$ of the future perception windows in the augmented system are calculated in a fashion that is identical to that for the virtual throughputs. In particular, the scheduling gain for an existing user i can either be estimated as the average of the measured or calculated scheduling gains, where the average is taken over all (or a subset) of the perceptions windows of user i. Alternatively, the predicted scheduling gain can be taken as the $z_i$-th percentile of the distribution of the scheduling gains measured for user i. Although the methods for predicting the virtual throughputs and the scheduling gain may be very similar, we note that in general the parameters $y_i$ and $z_i$ need not have the same numerical values. As with the virtual throughput prediction, the scheduling gain of a new user is predicted based on the series of measured scheduling gains of the user closest in geometry to the new user (albeit with a potentially different parameters $z_i$). Other alternative methods to predict a series of scheduling gains, such as those taking into account the traffic dynamics and the user arrival and departure processes, may also be considered as an extension of these schemes.

Having predicted the future virtual throughputs and the future scheduling gains for all the users in the augmented system, we are now in a position to calculate the predicted throughputs for future perception windows:

$$\hat{T}_{ij}(N+1) = \frac{\hat{G}_{ij}(N+1)}{N+1} \hat{R}_{ij}, \quad \forall i = 1, \ldots, N+1, \forall j$$

Note that, depending on the prediction methodologies employed, the predicted throughputs for a given user may be reduced to a single value. The objective of the admission control decision module is now to subject the predicted throughputs to the QoS feasibility criterion. For added generality, a QoS margin may be introduced and the new user or service is admitted to the system if the following condition is satisfied for all users in the system and for all future perception windows:

$$\hat{T}_{ij}(N+1) \geq (1+\alpha_i) T_{min,i}$$

where $\alpha_i$ is a QoS margin that can be tuned adaptively to regulate the behavior of the admission control scheme. In particular it can be adjusted to trade-off the probability of falsely admitting a new user versus the probability of falsely rejecting a new user that could have been admitted in the system without violating the QoS requirements. The QoS margin could be a function of, for example, the user's grade of service, or other parameters.

Voice-over-IP and Streaming Applications

In this third sub-section, we consider the scheduling gain framework for streaming and voice-like applications. This framework is generally applicable for supporting voice applications on a shared packet-switched channel. As a generic example for such an application, we consider voice-over-IP (VoIP) for which voice frames are issued by the transmitting unit every 20 msec. These frames are buffered in the radio access network (either the mobile terminal or at the base station) and await transmission over the air interface. Access to the air interface is again regulated by the scheduling and resource allocation algorithms. Voice frames are transmitted to the receiving unit for decoding. If a voice frame does not arrive within a certain delay bound at the receiving unit, the frame is dropped and the corresponding voice bits are lost. It is therefore imperative that the voice frames are transmitted over the air interface within a pre-determined delay budget.

If the number of competing voice users is too large, the scheduler and resource allocation algorithm may not be able to transmit all the frames for all the users within this delay budget. As a consequence, the perceived quality for at least some users will be degraded. The role of the admission control mechanism therefore is to ensure that the number of competing users is not too large, given the pre-determined delay budgets, the channel qualities and the required resources for each user, in order to ensure per-frame delays within the acceptable delay budget.

Typically, the QoS requirements for VoIP applications are expressed as a maximum allowed fraction $\epsilon$ of the frames that are allowed to violate the delay budget $\delta_{max}$. For example, a typical QoS requirement is that 98% of the frames need to be transmitted and received over the air interface within 150 msec.

The admission control problem and the setup of the scheduling gain based approach is similar to that of the bursty traffic scenario. Hence we only outline the main steps in the procedure, as well as the salient differences with the previous discussions.

We continue to denote a particular user by index i. Index j refers to a particular frame of interest. In a broader sense, the performance metric could also be the delay experienced by a certain number of data bits, thereby providing a direct analogy with the throughput metric over a specific perception window. $\delta_{ij}(N)$ denotes the j-th measurement of the experienced delay of user i when N users are present in the system. In other words, in the case of streaming or voice-like application, $\delta_{ij}(N)$ represents the per-frame delay experienced by the j-th frame of the i-th user. As an equivalent to the virtual throughput, we similarly define the virtual per-frame delay $\Delta_{ij}$ as the per-frame delay, that user i would have experienced in a single-user system. The actual and the virtual frame delays are related by the following expression, in which $G_{ij}(N)$ again denotes the scheduling gain experienced by frame j of user i if there are N users in the system:

$$\Delta_{ij} = \frac{G_{ij}(N)}{N}\delta_{ij}(N)$$

The above equation also serves as a definition of the scheduling gain:

$$G_{ij}(N) = \frac{N\Delta_{ij}}{\delta_{ij}(N)}$$

Note that the per-frame delay $\delta_{ij}(N)$ can be directly measured from the multi-user system performance. Note that in general, there is some variability in the virtual frame delays $\Delta_{ij}$. This variability is mainly attributed to the user's geometry (e.g., the long-term channel quality) as well as the variability in the channel quality as measured by the Doppler spread. For example, we expect to measure the largest virtual frame delays for users in low geometry with low Doppler. While the actual virtual frame delays could be used in the remainder of this discussion, we prefer to replace the frame delays by a single, statistically relevant quantity that captures the frame delays. This quantity is denoted by $\Delta_i$ and it could be either taken as the mean of the frame delays, or, preferably, the $(1-\epsilon)$-th percentile of the distribution of measured or calculated virtual frame delays. This value could also be determined through off-line simulations in which a single user system is considered. As the geometry of the user is varied, the corresponding values of the virtual frame delays are calculated and stored in a table that is used during by the prediction module in the admission control mechanism.

Based on the collected measurements of the frame delays for each VoIP flow, we now compute the critical delay $\delta^*_i(N)$ such that only a fraction $\epsilon$ of the frames have delay larger than $\delta^*_i(N)$. In other words, $\delta^*_i(N)$ is determined such that:

$$Pr(\delta_{ij}(N)<\delta^*_i(N))=1-\epsilon$$

Recall that $\epsilon$ is the allowed outage probability. The probability is in practice calculated as a fraction of transmitted/received frames over an appropriate time window. We also recall that the QoS requirement for VoIP applications is expressed as the criterion that only a fraction $\epsilon$ of the frames is allowed to have a delay larger than $\delta_{max}$:

$$Pr(\delta_{ij}(N)<\delta_{max})\geq 1-\epsilon$$

With the definition of the critical frame delay, the QoS feasibility criterion can be equivalently expressed as the condition that:

$$\delta^*_i(N)\leq \delta_{max}$$

We assume that the current system of N users is feasible and therefore the above condition is satisfied. If this condition is not satisfied, the system would be overloaded and new users should not be admitted. Based on the critical frame delay, we can now calculate a critical scheduling gain for each VoIP (or streaming) flow:

$$G^*_i(N) = \frac{N\Delta_i}{\delta^*_i(N)}$$

Having captured the performance of the existing system of N users, as well as the virtual performance, the goal then becomes to predict the performance of the augmented system in terms of the expected per-frame delays $\hat{\delta}_{ij}(N+1)$:

$$\hat{\delta}_{ij}(N+1) = \frac{N+1}{\hat{G}_{ij}(N+1)}\Delta_i, \quad \forall i=1,\ldots,N+1$$

Since the virtual frame delay only depends on the single-user system behavior and the user's channel qualities, we expect that the virtual frame delay in a system with N+1 users is the same as that in a system with N users. This is certainly applicable for all existing N users. If the new (logical) user corresponds to a physical user already present in the system, the corresponding value of $\Delta_t$ is taken as the virtual frame delay for the (N+1)-st user. On the other hand, if the new (logical) user also corresponds to a new physical user, the virtual frame delay is taken as that of the user closest in geometry to the new physical user.

Therefore the only remaining quantity that needs to be estimated in the above equation is the scheduling gain of all the users in the augmented system. In order to do so, we follow a similar approach to that encountered for infinitely backlogged users. Rather than predict the scheduling gain for each VoIP frame for each user in the system, we predict the critical scheduling gain for each user as a statistical representation of the frame delay distribution. The critical scheduling gain of the existing users in the system with N+1 users is estimated to remain constant to the calculated value for the system with N users. This estimation relies on the fact that the scheduling gain is a monotonically non-decreasing concave function and therefore exhibits diminishing marginal increases as the number of users becomes large. On the other hand, the critical scheduling gain for the new user is taken to be the average of the critical scheduling gains of the existing users:

$$\hat{G}_i^*(N+1) = G_i^*(N), \quad \forall i = 1, \ldots, N$$

$$\hat{G}_{N+1}^*(N+1) = \frac{1}{N}\sum_{i=1}^{N} G_i^*(N)$$

Different admission control mechanisms may differ in the prediction or other estimation of the scheduling gain of the new user. An attractive alternative would be to estimate the scheduling gain as that of the existing user closest in geometry.

Finally, based on the predicted frame delays, a new user should be admitted to the system if the following condition is satisfied for all VoIP flows in the system (the existing and the new flow):

$$Pr(\hat{\delta}_{ij}(N+1) < (1-\alpha)\delta_{max}) \geq 1-\epsilon, \forall i=1, \ldots, N+1$$

This condition expresses that at least a fraction 1−ε of the frames should have a predicted per-frame delay that is smaller than $(1-\alpha)\delta_{max}$, where a is again a QoS margin that can be tuned for more aggressive or more conservative admission control procedures. The default value for a is α=0. Note that if a very large negative value is chosen for α, the condition to be checked becomes weaker and the admission control mechanism is effectively turned off.

Using the condition to be checked and the definition of the predicted critical scheduling gain, the criterion for admitting a new user can be equivalently expressed as:

$$\hat{G}_i^*(N+1) \geq \frac{(N+1)\Delta_i}{(1-\alpha)\delta_{max}}, \quad \forall i = 1, \ldots, N+1$$

This criterion is valid independently of the method employed to predict the critical scheduling gains in the augmented system. However, with the particular prediction method proposed in this section, this criterion can be simplified and the following conditions need to be verified for admission of a new user:

$$\delta_i^*(N) \leq \frac{N}{N+1}(1-\alpha)\delta_{max}, \quad \forall i = 1, \ldots, N$$

$$\sum_{i=1}^{N} \frac{\Delta_i}{\delta_i^*(N)} \geq \frac{(N+1)\Delta_{N+1}}{(1-\alpha)\delta_{max}}$$

In these equations, recall that $\delta_i^*(N)$ is the critical frame delay that can be calculated from the time series of measured per-frame delays for each VoIP flow. $\Delta_i$ is the virtual frame delay for each user, which depends on the user's wireless channel condition. N is the number of users in the system. $\delta_{max}$ is the maximum tolerable per-frame delay and α is the QoS margin used to tune the performance of the admission control algorithm.

We conclude this section with an extension of the admission control mechanism described for general streaming applications (such as streaming video applications, which we will use as an illustrative example in this section), as a generalization of the VoIP traffic model that we have considered so far in this section. Indeed the basic setup and QoS requirements are very similar in that a certain amount of information bits need to be transmitted with a fixed delay budget. The main idea behind this extension is to convert each streaming application into an equivalent number of VoIP applications by computing the equivalent number of bits that would need to be transmitted within the delay bound corresponding to a VoIP user. Let β denote the equivalent number of VoIP users corresponding to a single video user. More precisely, let $B_{video}$ be the number of bits that have to be transmitted by a video application within an interval of $\delta_{video}$. Similarly, $B_{voice}$ is the number of bits that have to be transmitted by a VoIP application within an interval of $\delta_{voice}$. In general, we may assume that $\delta_{voice}$ is less than or equal to $\delta_{video}$. Then $B_{equi-video}$ is the number of bits that need to be transmitted by a video application during the time interval $\delta_{voice}$ and can be approximated as:

$$B_{equi-video} = \frac{B_{video}}{\delta_{video}}\delta_{voice}$$

The equivalent number β of VoIP users for each video user is then calculated as:

$$\beta = \frac{B_{equi-video}}{B_{voice}}$$

β could be less than 1, and in general, it could be any fraction. Finally, let $N_{equiv}$ be the total equivalent number of VoIP users in an integrated system of video and VoIP users (or more generally in an integrated system of different streaming and voice-like applications, such as gaming). $N_{equiv}$ is determined by the following expression:

$$N_{equiv} = N_{voice} + \beta N_{video}$$

where $N_{voice}$ and $N_{video}$ are, respectively, the number of VoIP and the number of video users in the system.

It is then quite straightforward to generalize the admission control criteria for an integrated system and the following conditions need to be verified:

$$(1 + \beta/N_{equiv})\delta_i^* \le \theta(1-\alpha)\delta_{max},$$

$$\forall\, i = 1, \ldots, N$$

$$\sum_{i=1}^{N_{equiv}} \frac{\Delta_i}{\delta_i^*} \ge \frac{(N_{equiv}+1)\Delta_{N_{equiv}+\beta}}{(1-\alpha)\delta_{max}}$$

In these equations, $\theta$ is typically taken as $\theta=1$, but could be generalized as a function of N. $\beta=1$ for VoIP users and is in general the equivalent number of VoIP users calculated above. $\delta_{max}$ is the maximum delay bound for VoIP applications and $\Delta_i$ is the equivalent virtual delay for a voice application associated with the physical user.

The illustrative embodiments described above provide methods for calculating the scheduling gain in an existing system of N users and for estimating the future scheduling gain in the augmented system of potentially N+1 users. These estimates are then used to predict the throughput and delay performances in the augmented system and to arrive at the admission control criteria.

The illustrative embodiments of the invention as described above provide a number of significant advantages over conventional practice. For example, the admission control techniques of these embodiments incorporate the QoS requirements of the different users into the admission control decision. Also, the admission control decision is tailored towards wireless packet data networks and the use of opportunistic scheduling algorithms.

Another advantage is that the admission control techniques of the illustrative embodiments may make use of, but do not require, explicit knowledge of the underlying scheduling algorithms.

A further advantage is that the admission control decision is based on the status of the network at the time of the request for admission of the new user and the prediction of the evolution of the status of the network if the new user is admitted to the network. The admission control decision does not rely on historical data and network behavior but operates in real-time based on the actual state of the network.

Again, it should be emphasized that the embodiments of the invention as described herein are intended to be illustrative only.

For example, the techniques described above are applicable to a wide variety of different types of wireless networks or other systems. The techniques can be used in networks having a very diverse population of users, with different applications, services and QoS requirements. Current and next-generation wireless networks can benefit from these techniques, including, without limitation, CDMA 2000 and UMTS networks.

As indicated previously, the admission control techniques of the illustrative embodiments are applicable to the forward and the reverse links in wireless networks and are not limited to any particular system type. Accordingly, these techniques are applicable to a wide variety of systems. The implementation can be adapted in a straightforward manner to accommodate the particular details of a given wireless network or other system.

Furthermore, the techniques of the illustrative embodiments can be adapted in a straightforward manner for use with any type of scheduling algorithm. The manner in which scheduling gain is predicted can be varied to accommodate the particular operating characteristics of a given system.

As noted above, the present invention may be implemented at least in part in the form of one or more software programs that, within a given processing element, are stored in a memory and run on a processor. Such processor and memory elements may comprise one or more integrated circuits.

Numerous other alternative embodiments within the scope of the following claims will be readily apparent to those skilled in the art.

We claim:

1. An apparatus for controlling admission of users to a communication system, the apparatus comprising:

a scheduler configured to manage access to network resources for users already admitted to the system; and an admission control module coupled to the scheduler, the admission control module determining a predicted scheduling gain of the scheduler under an operating scenario involving admission of at least one additional user to the system, the predicted scheduling gain being processed to generate at least one performance metric which is used to make an admission control decision regarding admission of the at least one additional user to the system;

wherein determining a predicted scheduling gain further comprises determining predicted scheduling gains for respective ones of a plurality of users including the users already admitted to the system and the at least one additional user;

wherein predicted virtual performance measures are also determined for respective ones of the plurality of users;

each of said predicted virtual performance measures identifying, for a corresponding one of the users, performance that user would have received if that user was the only user admitted to the system; and wherein the at least one performance metric comprises performance metrics determined for respective ones of the plurality of users;

each of said performance metrics being determined for a corresponding one of the users based on the predicted scheduling gain and predicted virtual performance measure for that user.

2. The apparatus of claim 1 wherein the predicted scheduling gain comprises a plurality of predicted scheduling gains determined for respective ones of the admitted and at least one additional users.

3. The apparatus of claim 2 wherein an actual scheduling gain is determined for a given admitted user by measuring an actual performance for that user, computing a virtual performance for the given user indicating the performance that user would have received if it were the only admitted user, and calculating the actual scheduling gain for the given user based on the actual measured performance for that user, the virtual performance of that user and the total number of admitted users.

4. The apparatus of claim 1 wherein the predicted scheduling gain is determined for the at least one additional user at least in part as a function of actual scheduling gains of the admitted users.

5. The apparatus of claim 4 wherein the predicted scheduling gain is determined for the at least one additional user as an average of the actual scheduling gains of the admitted users.

6. The apparatus of claim 4 wherein the predicted scheduling gain is determined for the at least one additional user as a minimum value of the actual scheduling gains of the admitted users.

7. The apparatus of claim 4 wherein predicted virtual performance is computed for respective ones of the admitted and at least one additional users.

8. The apparatus of claim 7 wherein the predicted scheduling gains and corresponding predicted virtual performances are utilized to calculate performance metrics for respective ones of the admitted and at least one additional users.

9. The apparatus of claim 8 wherein the performance metrics determined for respective ones of the admitted and at least one additional users are processed using corresponding acceptability criteria in order to make the admission control decision regarding admission of the at least one additional user to the system.

10. The apparatus of claim 1 wherein the admission control decision is based on whether the system can support quality-of-service requirements of the at least one additional user without violating any quality-of-service requirements of the users already admitted to the system.

11. The apparatus of claim 1 wherein at least a subset of the users are associated with respective communication devices.

12. The apparatus of claim 1 wherein at least two of the users comprise different applications associated with a single communication device.

13. The apparatus of claim 1 wherein the admission control module comprises a performance predictor module which determines the predicted scheduling gain and utilizes the predicted scheduling gain to generate the performance metric, and a decision module adapted to receive the performance metric from the performance predictor module and to make the admission control decision based on the performance metric.

14. The apparatus of claim 1 wherein the scheduler and the admission control module are implemented in a base station of the system.

15. The apparatus of claim 1 wherein the admission control module determines, for a given application of a first type, an equivalent number of applications of a second type, by computing a number of bits equivalent to that which would need to be transmitted by the given application of the first type within a delay bound corresponding to the applications of the second type.

16. An apparatus for controlling admission of users to a communication system, the apparatus comprising:
   a memory; and
   a processor coupled to the memory;
   the processor being configured to implement at least a portion of an admission control module;
   the admission control module being associated with a scheduler configured to manage access to network resources for users already admitted to the system;
   wherein the admission control module determines a predicted scheduling gain of the scheduler under an operating scenario involving admission of at least one additional user to the system, the predicted scheduling gain being processed to generate at least one performance metric which is used to make an admission control decision regarding admission of the at least one additional user to the system;
   wherein the predicted scheduling gain further comprises predicted scheduling gains determined for respective ones of a plurality of users including the users already admitted to the system and the at least one additional user;
   wherein predicted virtual performance measures are also determined for respective ones of the plurality of users;
   each of said predicted virtual performance measures identifying, for a corresponding one of the users, performance that user would have received if that user was the only user admitted to the system; and
   wherein the at least one performance metric comprises performance metrics determined for respective ones of the plurality of users;
   each of said performance metrics being determined for a corresponding one of the users based on the predicted scheduling gain and predicted virtual performance measure for that user.

17. The apparatus of claim 16 wherein the memory and processor are implemented in a base station of the system.

18. The apparatus of claim 16 wherein the memory and processor are implemented in a radio network controller of the system.

19. A method of controlling admission of users to a communication system, the method comprising the steps of:
   utilizing a scheduler to manage access to network resources for users already admitted to the system;
   determining a predicted scheduling gain of the scheduler under an operating scenario involving admission of at least one additional user to the system; and
   processing the predicted scheduling gain to generate at least one performance metric which is used to make an admission control decision regarding admission of the at least one additional user to the system; wherein the determining and processing steps are performed by an admission control module associated with the scheduler;
   wherein the step of determining a predicted scheduling gain further comprises determining predicted scheduling gains for respective ones of a plurality of users including the users already admitted to the system and the at least one additional user;
   wherein predicted virtual performance measures are also determined for respective ones of the plurality of users;
   each of said predicted virtual performance measures identifying, for a corresponding one of the users, performance that user would have received if that user was the only user admitted to the system; and
   wherein the at least one performance metric comprises performance metrics determined for respective ones of the plurality of users;
   each of said performance metrics being determined for a corresponding one of the users based on the predicted scheduling gain and predicted virtual performance measure for that user.

20. A computer-readable storage medium comprising executable program code that when executed by a processing element of the system implements the utilizing, determining and processing steps of:
   utilizing a scheduler to manage access to network resources for users already admitted to the system;
   determining a predicted scheduling gain of the scheduler under an operating scenario involving admission of at least one additional user to the system; and
   processing the predicted scheduling gain to generate at least one performance metric which is used to make an admission control decision regarding admission of the at least one additional user to the system;
   wherein the step of determining a predicted scheduling gain further comprises determining predicted scheduling gains for respective ones of a plurality of users including the users already admitted to the system and the at least one additional user;

wherein predicted virtual performance measures are also determined for respective ones of the plurality of users;

each of said predicted virtual performance measures identifying, for a corresponding one of the users, performance that user would have received if that user was the only user admitted to the system; and wherein the at least one performance metric comprises performance metrics determined for respective ones of the plurality of users;

each of said performance metrics being determined for a corresponding one of the users based on the predicted scheduling gain and predicted virtual performance measure for that user.

* * * * *